Figure 1:
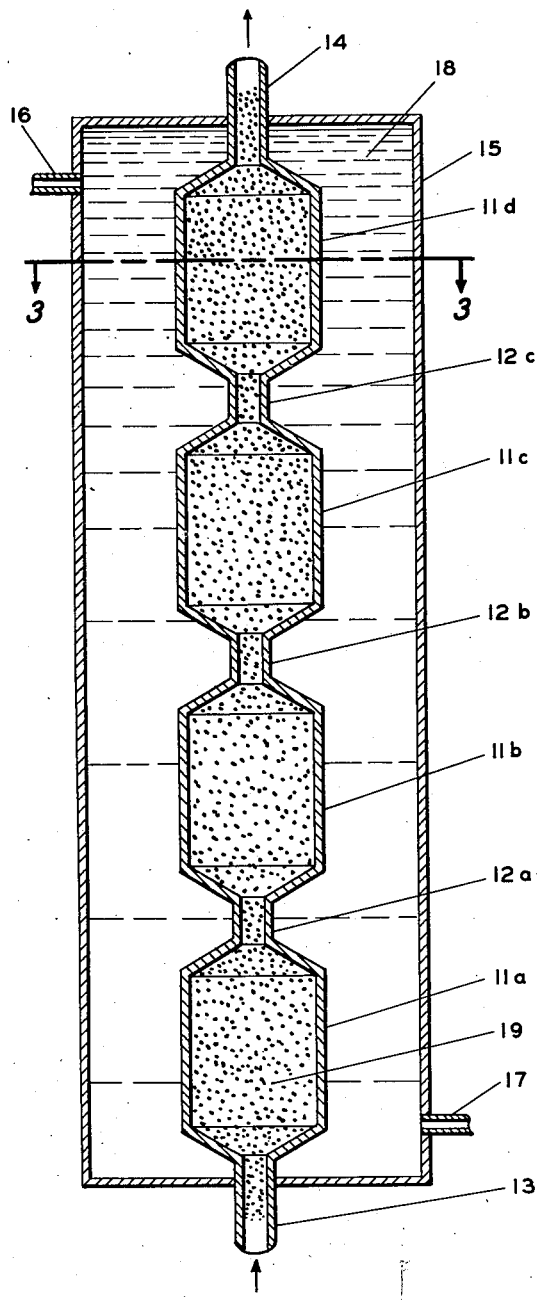

Sept. 30, 1952             J. N. MORAN             2,612,512
PROCESS FOR THE SYNTHESIS OF HYDROCARBONS FROM CARBON MONOXIDE
AND HYDROGEN BY MEANS OF A FLUIDIZED FIXED-BED
Filed Sept. 16, 1947             2 SHEETS—SHEET 1

INVENTOR.
J.N. MORAN
BY Hudson and Young
ATTORNEYS

Sept. 30, 1952 J. N. MORAN 2,612,512
PROCESS FOR THE SYNTHESIS OF HYDROCARBONS FROM CARBON MONOXIDE
AND HYDROGEN BY MEANS OF A FLUIDIZED FIXED-BED
Filed Sept. 16, 1947 2 SHEETS—SHEET 2

INVENTOR.
J. N. MORAN
BY
ATTORNEYS

Patented Sept. 30, 1952

2,612,512

UNITED STATES PATENT OFFICE 2,612,512

PROCESS FOR THE SYNTHESIS OF HYDROCARBONS FROM CARBON MONOXIDE AND HYDROGEN BY MEANS OF A FLUIDIZED FIXED-BED

Jesse N. Moran, Bartlesville, Okla., assignor to Phillips Petroleum Company, a corporation of Delaware Application September 16, 1947, Serial No. 774,385

3 Claims. (Cl. 260—449)

This invention relates to the synthesis of hydrocarbons by the reduction of an oxide of carbon with hydrogen. In one of its more specific aspects it relates to the synthesis of hydrocarbons by the reduction of carbon monoxide with hydrogen in a fluidized fixed-bed conversion chamber.

In the process of synthesizing hydrocarbons, which process is known to the petroleum industry as Fischer-Tropsch synthesis, an oxide of carbon, e. g., carbon monoxide, and hydrogen are reacted together at suitable elevated temperatures in the presence of a selected catalyst to yield higher boiling organic compounds, including hydrocarbons ranging from light gaseous methane to heavy liquids or waxes. Catalysts commonly used for this synthesis are sintered iron, and compounds or compositions comprising cobalt, nickel, and/or ruthenium. These catalysts may be promoted with such materials as alkali metals, alkaline earths, or their oxides, or with thoria or various other promoters. The catalysts may be utilized in either a static fixed bed or in a fluidized bed. In fixed bed operations it is common practice to support the catalyst on an inert supporting material such as kieselguhr or the like. Such support materials may be crushed to any desired mesh size. It is common practice to dissolve the catalyst material and the promoters in a suitable liquid solvent which mixture is then mixed with the support material and the promoter and catalyst materials are precipitated from their solution by means of an alkaline solution. When utilizing the fluidized catalyst modification of this synthesis, in which a catalyst in the form of a freely flowing powder is normally suspended in the gaseous material passing through the reaction zone, the promoter material is usually fused into the catalyst and the resulting hard mass is ground to a relatively hard, abrasion-resistant powder.

When synthesizing hydrocarbons utilizing a static fixed catalyst bed it has been necessary to operate at relatively low space velocities, such as between about 100 and about 300, and the rate of production of hydrocarbons heavier than ethane has been undesirably low. It has recently been found that when fluidized fixed-bed operation is applied to the Fischer-Tropsch process space velocities and consequently the production rate can be greatly increased. Thus, whereas in static fixed-bed operation, space velocities of about 100 to about 300 are used, in fluidized fixed-bed operations, space velocities as high as 5000 may be used, and a correspondingly increased rate of production of hydrocarbons heavier than ethane may be obtained. In fluidized fixed-bed operation, the synthesis gas, which comprises carbon monoxide and hydrogen in a molar ratio of from about 1:2 to 2:3, is contacted with a finely ground catalyst at such a linear velocity that the catalyst is continually agitated and uniformly distributed, but is not substantially carried out of the reactor.

Although fluidized fixed-bed operation permits increased space velocities, it also entails certain problems. One problem is that of maintaining the linear velocity of the synthesis gas sufficiently high throughout the length of the reactor to maintain catalyst fluidization and, at the same time, sufficiently low to prevent undesirably high yields of light hydrocarbons such as methane and also to prevent undesirably high temperatures near the inlet of the reactor. This problem is accentuated in the Fischer-Tropsch process, since as a result of the union of carbon monoxide with hydrogen to form normally liquid products, the gas volume continuously decreases during passage through the reactor.

An object of the present invention is to provide an improved reactor for the synthesis of hydrocarbons by the reduction of carbon monoxide with hydrogen. Another object is to provide an improved reactor for such synthesis in which fluidization of the catalyst is facilitated. Another object is to provide an improved reactor for such synthesis in which the removal of heat of reaction is facilitated. Another object is to provide a method of conducting the synthesis of hydrocarbons by catalytic reduction of carbon monoxide and hydrogen using the improved reactor of the present invention. Another object is to provide a method for maintaining linear velocities through a reactor. Another object is to prevent undesirably high temperatures near the inlet of a reactor. Other and further objects will be apparent to those skilled in the art upon study of the accompanying description and drawings.

The present invention provides a solution for the problem of maintaining linear velocity of the synthesis gas throughout the length of a fluidized fixed-bed reactor. Understanding of the invention will be facilitated by reference to the accompanying diagrammatic drawings. Figure 1 of the drawing is a cross section view of a Fischer-Tropsch reactor designed in accordance with this invention. The reactor comprises a plurality of unobstructed reaction chambers 11a, 11b, 11c and 11d which are preferably disposed in a substantially vertical series. The reaction chambers are connected by unobstructed conduit means, such as throats 12a, 12b and 12c. The internal diameter of throats 12a, b and c is of such size as to allow the flow of synthesis gas and catalyst therethrough but is preferably of a cross sectional area not greater than one-fourth of the maximum cross sectional area of the reaction chambers. The shape of the reaction chambers and throats is not critical but they are preferably cylindrical and have extending conical members closing each end of said chambers. The conical shaped members substantially reduce dead areas within the chambers. Inlet means, such as conduit 13 is provided to convey synthesis gas from a synthesis gas supply into the lower portion of reaction chamber 11a enclosing a reaction zone therein. Outlet means, such as conduit 14 is provided to convey the effluent from the upper portion of reaction chamber 11d. Outer chamber 15 surrounds the plurality of reaction chambers and connecting conduits and forms a cooling zone in the space between the outer chamber and the reaction chambers and connecting conduits. Coolant inlet means, such as conduit 16 is provided in the upper portion of the outer chamber for the purpose of conveying a cooling fluid into the cooling zone. Coolant outlet means, such as conduit 17, is provided in the lower portion of the outer chamber for the purpose of removing cooling fluid therefrom. Cooling fluid 18 may be water, a heavy oil, or any other coolant known to be suitable for use for the removal of heat from a reaction zone by indirect heat exchange. Particulate or powdered catalyst 19 is preferably contained within the reaction chamber; e. g., the lower two reaction zones may be filled with catalyst before the start-up and will be distributed to the remaining reaction zones by the flow of synthesis gas. The catalyst may be any one of the catalysts suitable for Fischer-Tropsch synthesis. It is preferred, however, to use a catalyst prepared by fusing iron oxide, cooling and grinding the fused material to a size within the range of from about 65 to about 100 mesh and reducing the ground material with hydrogen. Alkaline promoters, such as potassium carbonate or barium hydroxide, may be added if desired.

In the operation of the reactor shown in Figure 1, synthesis gas containing hydrogen and carbon monoxide in a molar ratio of about 3:2 and an inert diluent such as nitrogen is introduced into the reaction zones through inlet 13. When catalyst material has been precharged to the reaction zones, only sufficient amounts of the particulate catalyst are added with the synthesis gas to make up the loss of catalyst through outlet conduit 14. If catalyst material is not precharged to the reaction zones, sufficient catalyst is fed to the reactor with the synthesis gas to get the desired reaction. The synthesis gas enters the reaction chamber through inlet 13 at a relatively high velocity, which velocity decreases within the reaction zone. With such velocity, however, the catalyst contained in the reaction zone of chamber 11a is substantially entirely fluidized. A portion of the carbon monoxide and hydrogen will coact therein to form hydrocarbons in the reaction zone. The synthesis gas, reaction products and a portion of the catalyst then pass through communicating conduit 12a at an increased velocity which substantially fluidizes the catalyst contained in the reaction zone of chamber 11b. Upon passing into reaction chamber 11b, the velocity of the gas once more diminishes. These steps are repeated in the passage of the synthesis gas, products, and a small portion of the catalyst through the remainder of the communicating conduits and reaction zones. The diluent of the synthesis gas is of a sufficient volume to furnish the desired velocity in passing from one reaction zone through the communicating zone into the succeeding reaction zone. By this combination of restricted communication zones and larger reaction zones together with the use of a diluent gas, the linear velocity is substantially maintained throughout the entire length of the reactor, and channeling is obviated, or at least greatly minimized. Separation means (not shown), such as a cyclone separator or a Cottrell electric precipitator, may be provided in conduit 14 for the purpose of separating entrained catalyst from the reactor effluent stream. The diluent gas may also be separated from the effluent stream at substantially the same point. The catalyst and diluent gas may then be recycled to inlet conduit 13 and reused in the synthesis process.

A suitable cooling fluid such as water, heavy oil, or any other conventional coolant fluid is injected into the cooling zone through coolant inlet 16 and is caused to pass countercurrently to the direction of flow of the synthesis gas within the reaction and communicating zones and is removed from the coolant zone through coolant outlet 17. In the device of this invention, the temperature of reaction is much more easily controlled by the increased cooling surface, since more complete indirect contact between the synthesis gases and the cooling fluid is obtained. A portion of the heat is removed while the gas is still in the reaction zone and an additional portion is removed as the gases pass through the smaller communicating conduits.

Suitable reaction conditions in a Fischer-Tropsch process using a reactor of the present invention are a temperature within the range of between about 300 and about 320° C., a pressure between about 10 and about 20 atmospheres, and an overall space velocity between about 1500 and about 5000 volumes (STP) of synthesis gas per volume of catalyst per hour.

Figure 2:
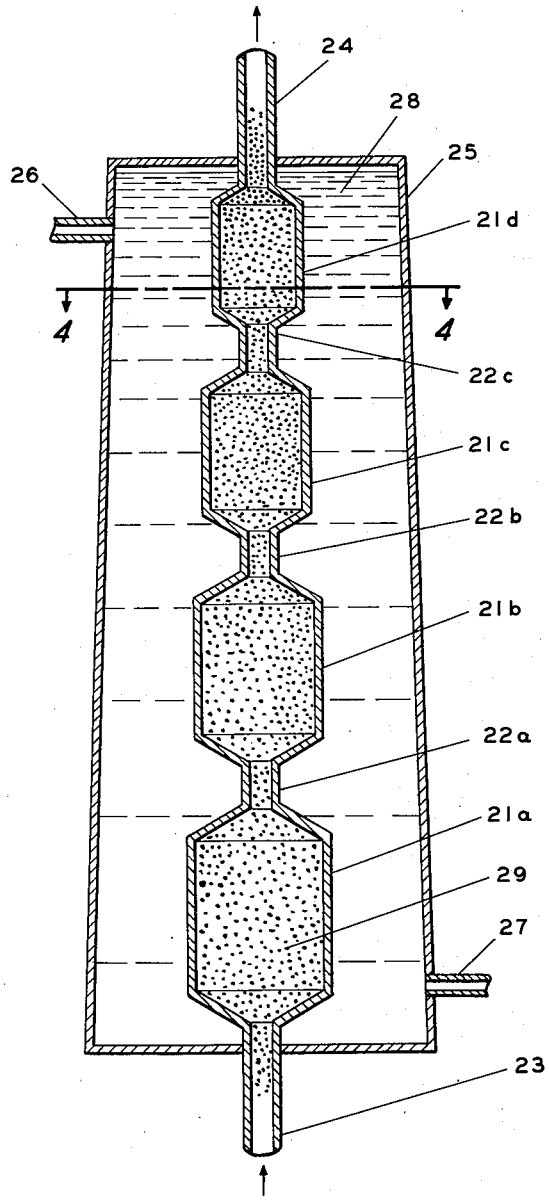

Figure 2 is a sectional view of a preferred modification of the reactor of the present invention. The reaction chambers 21a, 21b, 21c and 21d, enclosing reaction zones therein, are similar to chambers 11a, b, c and d, shown in Figure 1, with the exception that the chambers decrease in volume from 21a to 21d. Communicating conduit means 22a, b, and c are similar to communicating conduits 12a, b, and c. The cross sectional areas of conduit means 22a, b, and c should be no greater than one-fourth of the cross sectional area of the larger or lower of the reaction chambers between which each communicates. Synthesis gas is introduced into reaction chamber 21a through inlet means, such as conduit 23 at a sufficient velocity to fluidize the catalyst either contained in the reaction zone or carried into the reaction zone by the synthesis gas. In the reaction zone the velocity decreases substantially as a result of volume decrease. The gas then passes through communicating conduit 23a at a sufficiently increased velocity to substantially fluidize the catalyst in the smaller reaction zone 21b and similar steps are carried on throughout the length of the series of reaction zones and communicating conduits. The effluent from reaction zone 21d is removed through outlet means, such as conduit 24. Any conventional separation means (not shown) may be provided in conduit 24 to separate entrained catalyst from the effluent stream. This separated catalyst is recycled to inlet conduit 23 and is reused in the synthesis process. Outer chamber 25 surrounds the series of reaction chambers and communicating conduits and may be of any desired shape. It is necessary only that the outer chamber be large enough to provide sufficient space therein for the coolant which is used in indirect heat exchange relation with the materials within the reaction and communicating zones. The outer chamber 25 is provided in its upper portion with a coolant inlet means, such as conduit 26 and in its lower portion with a coolant outlet means, such as conduit 27. Cooling fluid 28 may be the same as cooling fluid 18. Particulate catalyst 29 may be any conventional Fischer-Tropsch catalyst. The cooling fluid, as in the reactor shown in Figure 1, is caused to pass countercurrently, within the outer chamber, to the direction of flow of the synthesis gas within the reaction and communicating zones. In the operation of the device of the reactor shown in Figure 2, a diluent may be used as part of the synthesis gas. A part of its purpose is, however, replaced by the reaction chambers of diminishing volume through the reactor. As the volume of the synthesis gas diminishes because of the reduction of the carbon monoxide and hydrogen, the gas is passed into a reaction zone having a smaller volume than the next preceding reaction zone thus allowing the synthesis gas and reaction products to maintain fluidizing linear velocity through the reactor and a corresponding space velocity is maintained at corresponding positions in the reaction zones. The reactor of Figure 2 is therefore preferred for synthesis gas containing substantially no diluents or relatively small proportions of diluents.

Figure 3:
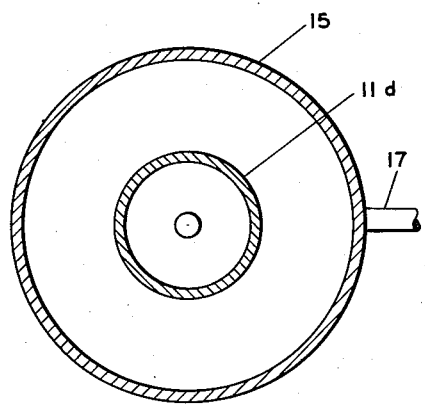
Figure 4:
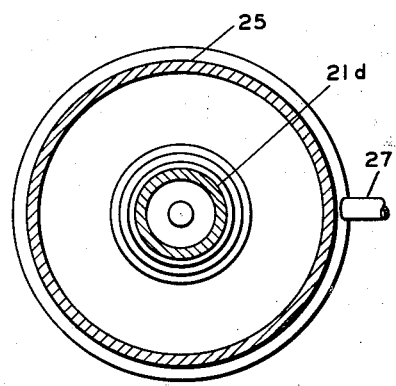

Figure 3 is a cross section horizontal view taken along line 3—3 of Figure 1. Figure 4 is a cross section horizontal view taken along line 4—4 of Figure 2.

Although each of the reactors shown in the drawing discloses the use of four reaction chambers, the invention is not limited to any specific number of such chambers. It is necessary only that a sufficient reactor length be provided to secure the desired reaction of the synthesis gas.

Temperatures in a Fischer-Tropsch process must be confined within relatively narrow ranges, depending upon the catalyst used. These temperatures, for the specific catalysts, are well known to those skilled in the art. One of the additional advantages of a reactor constructed in accordance with this invention as compared with conventional cylindrical reactors is that increased efficiency is obtained in the removal of heat of reaction produced by the reaction of the carbon monoxide with the hydrogen. The increased efficiency of heat removal is a result of the relatively large chamber surface exposed to the coolant and also of the greater amounts of synthesis gas caused to contact the cool surface.

*Example*

In a Fischer-Tropsch reactor in which hydrocarbons are synthesized by passing a synthesis gas containing about 20 mol per cent nitrogen, 50 mol per cent hydrogen and 30 mol per cent carbon monoxide through a vertical cylindrical reactor containing 65 to 100 mesh reducing iron catalyst, fluidization of the catalyst throughout the reactor is difficult to maintain. Under reaction conditions of an initial inlet temperature of 315° C., a pressure of 10 atmospheres and space velocity of 2500 volumes of synthesis gas per volume of catalyst per hour, the catalyst near the inlet is satisfactorily fluidized, but the catalyst further downstream is not. The result is that synthesis gases further downstream are substantially unreacted. Increasing the overall space velocity sufficiently to fluidize all of the catalyst results in an undesirably high temperature at the reactor inlet, and an undesirably high proportion of the unreacted carbon monoxide is converted to methane.

When a reactor similar to that in Figure 1, comprising four cylindrical catalyst chambers each 2" in diameter and connected in series by ¼" diameter cylindrical conduits is substituted for the previously mentioned cylindrical reactor, satisfactory fluidization of the catalyst is readily maintained throughout the reactor and satisfactory yields of liquid hydrocarbons are obtained.

Other embodiments of the invention may also be constructed, for example, several separate series of reaction chambers of the types shown in Figures 1 and 2 may be operated in parallel inside a single cooling jacket. Another desirable modification is to reverse the flow of fluid through the cooling chamber, injecting a liquid through conduit 17 or 27, cooling the reactant material by vaporizing the liquid and removing the vapor through conduit 16 or 26.

Although this invention has been described with some particularity, it is clear that many modifications and changes may be made by those skilled in the art without departing from the scope and the intent of the invention.

I claim:

1. A fluidized fixed-bed method for synthesizing hydrocarbons by the reduction of hydrogen and carbon monoxide which comprises the steps of introducing all of a synthesis gas comprising hydrogen and carbon monoxide into the lower portion of a first unobstructed reaction zone of a reaction chamber at a reaction temperature and at a velocity sufficient to uniformly distribute a particulate catalyst within and throughout said unobstructed reaction zone; passing said synthesis gas and resulting reaction products through an unobstructed constriction zone of said reaction chamber into a second unobstructed reaction zone of a smaller volume than said first reaction zone with sufficient velocity to similarly uniformly distribute particulate catalyst therein; similarly passing said synthesis gas and reaction products through at least one more unobstructed constriction zone and at least one more unobstructed reaction zone successively smaller than its immediately preceding reaction zone of said reaction chamber, the supplying of gas to the lower portion of said first reaction zone being the sole supply of gas to said reaction zones; maintaining the overall space velocity through said reaction zones at between 1500 and 5000 volumes (STP) of gas per volume of catalyst per hour so that a corresponding space velocity is maintained at corresponding positions in the reaction zones; passing a coolant through a cooling zone surrounding the length of said reaction zones and constriction zones of said reaction chamber so as to remove resulting heat of reaction at the periphery of said zones from the materials within said zone; removing said reaction products and a small portion of said catalyst from the last successive zone of said reaction chamber; separating said resulting reaction products and said catalyst; and recycling said catalyst only to said first unobstructed reaction zone.

2. The method of claim 1, wherein a substantially inert diluent gas is supplied to said reaction zones with said synthesis gas.

3. A fluidized fixed-bed method for synthesizing hydrocarbons by the reduction of hydrogen and carbon monoxide which comprises the steps of introducing all of a synthesis gas comprising hydrogen and carbon monoxide into the lower portion of a first unobstructed reaction zone of a reaction chamber at a reaction temperature and at a velocity sufficient to uniformly distribute a particulate catalyst within and throughout said first reaction zone; passing said synthesis gas and resulting reaction products through an unobstructed constriction zone of said reaction chamber into a second unobstructed reaction zone of a smaller volume than said first reaction zone with sufficient velocity to similarly uniformly distribute particulate catalyst therein; similarly passing said synthesis gas and reaction products through at least one more unobstructed constriction zone and at least one more unobstructed reaction zone successively smaller than its immediately preceding reaction zone of said reaction chamber; maintaining the overall space velocity through said reaction zones at between 1500 and 5000 volumes (STP) of gas per volume of catalyst per hour so that a corresponding space velocity is maintained at corresponding positions in the reaction zones; passing a coolant through a cooling zone surrounding the length of said unobstructed reaction zones and constriction zones of said reaction chamber to remove resulting heat of reaction at the periphery of said zones from the materials within said zones; removing said reaction products and a small portion of said catalyst from the last successive zone of said reaction chamber; separating said reaction products and said catalyst; and recycling said catalyst only to said first unobstructed reaction zone.

JESSE N. MORAN.

REFERENCES CITED

The following references are of record in the file of this patent:

UNITED STATES PATENTS

| Number | Name | Date |
| --- | --- | --- |
| 1,903,568 | Goldsbrough | Apr. 11, 1933 |
| 2,248,734 | Barr | July 8, 1941 |
| 2,310,907 | McMillan | Feb. 9, 1943 |
| 2,351,248 | Wirth et al. | June 13, 1944 |
| 2,360,787 | Murphree et al. | Oct. 17, 1944 |
| 2,463,912 | Scharmann | Mar. 8, 1946 |
| 2,425,098 | Kassel | Aug. 5, 1947 |
| 2,432,745 | Gary | Dec. 16, 1947 |
| 2,467,802 | Barr | Apr. 19, 1949 |